United States Patent [19]

Akashi et al.

[11] Patent Number: 4,789,814

[45] Date of Patent: Dec. 6, 1988

[54] TRANSPORT SPEED CONTROL SYSTEM FOR GLASS ANNEALING INSTALLATION

[75] Inventors: Naotomo Akashi, Maizuru; Takeshi Yokokawa, Takarazuka; Katsuaki Ninomiya, Maizuru; Harumi Shima, Osaka; Takeshi Horiguchi, Nishinomiya, all of Japan

[73] Assignee: Nippon Sheet Glass Co., Ltd., Dosho, Japan

[21] Appl. No.: 70,709

[22] Filed: Jul. 7, 1987

[30] Foreign Application Priority Data

Jul. 7, 1986 [JP] Japan .................... 61-159222

[51] Int. Cl.[4] .................................................... H02P 5/46
[52] U.S. Cl. ........................................... 318/77; 318/68
[58] Field of Search ................. 318/45, 46, 53, 67, 318/68, 77, 66; 364/573

[56] References Cited

U.S. PATENT DOCUMENTS

| 2,320,850 | 6/1943 | Cook ........................ 318/77 |
| 3,050,670 | 8/1962 | Anger et al. ............... 318/77X |
| 3,585,470 | 6/1971 | Connors .................... 318/53 |
| 4,334,175 | 6/1982 | Tanaka et al. ............. 318/68 X |

Primary Examiner—Bentsu Ro
Attorney, Agent, or Firm—Gifford, Groh, Sheridan, Sprinkle and Dolgorukov

[57] ABSTRACT

A transport speed control system for a glass ribbon annealing installation comprising means to control a peripheral drive speed of those of glass ribbon transporting rollers which contact a portion of the glass ribbon at positions downstream of at least a substantially mid-position of the glass ribbon with respect to a direction of transport, to be higher than an advancing speed of that portion of the glass ribbon.

6 Claims, 1 Drawing Sheet

TRANSPORT SPEED CONTROL SYSTEM FOR GLASS ANNEALING INSTALLATION

BACKGROUND OF THE INVENTION

1. Field of the Invention

The present invention relates to a transport speed control system for a flat glass annealing lehr provided at an intermediate position along a glass ribbon production line and including a plurality of glass ribbon transport rollers in juxtaposition.

2. Description of the Prior Art

FIG. 2 of the accompanying drawings illustrates an example of transport speed control system for the glass ribbon annealing installation of the type noted above. As seen, the speed control system includes a motor 52 for driving all glass ribbon transport rollers 50 simultaneously through a speed reducer 51, a drive speed sensor 53 for detecting peripheral speeds of rollers 50 on the basis of rotational rates of the speed reducer 51, a drive speed setter 54 for setting a peripheral speed of all the rollers 50, and a controller 55 responsive to a detection signal from the sensor 53 and a speed setting signal from the speed setter 54 for outputting a control signal to the motor 52 to drive the rollers 50 at the set peripheral speed.

Such a known transport speed control system is designed to drive all of the rollers 50 at an equal peripheral speed in order to transport a glass ribbon in a stree-free state. However, the rollers in an upstream part of the furnace with respect to the direction of transport are exposed to a higher glass ribbon temperature than downstream rollers, and therefore a greater thermal expansion and a greater eccentricity occur with the upstream rollers. Besides, salt cakes adhere to peripheral surfaces of the rollers 50 in an increasing amount as a glass ribbon is transported. These phenomena positively cause the upstream rollers to rotate at a higher peripheral speed than the downstream rollers, with the result that the transported glass ribbon is constantly subjected to a compressive force. While the transported glass ribbon has a high temperature in the range of 500°-600° C. and remains highly viscous and soft, for example, the glass ribbon tends to warp into a permanent deformation owing to an internal stress. On the other hand, the transported glass ribbon at a lower temperature could develop cracks.

Furthermore, since there is a difference between a peripheral speed of the rollers and the glass ribbon transport speed, any projections on roller surfaces may abrade the glass ribbon.

The above problems, particularly the problem of deformation and cracking, are the more conspicuous the thinner the transported glass ribbon is.

SUMMARY OF THE INVENTION

Having regard to the above-noted problems, the object of the present invention is to provide a transport speed control system operable to drive a plurality of rollers at optimal peripheral speeds under rational control, thereby to transport a glass ribbon without warping or cracking the glass ribbon despite the thermal expansion of the rollers and the adhesion thereto of salt cakes.

In order to achieve this object, a transport speed control system for a glass ribbon annealing installation according to the invention comprises means to control a peripheral drive speed of those of glass ribbon transport rollers which contact a portion of the glass ribbon at positions downstream of at least a substantially midposition of said glass ribbon with respect to a direction of transport, to be higher than an advancing speed of said portion of the glass ribbon.

In the transport speed control system for a glass ribbon annealing installation according to this invention, the glass ribbon transport rollers are divided into a plurality of groups in the direction of transport. The downstream groups of rollers are driven at higher peripheral speeds in anticipation of a speed increase due to the thermal expansion and eccentricity of the rollers and the adhesion thereto of salt cakes. The transported glass ribbon is therefore free from the compression encountered in the prior art though a tension may act on the glass ribbon.

Consequently, the invention provides an effective prevention against the warping and cracks of the transported glass ribbon attributable to varied thermal expansion rates of the glass ribbon transport rollers and the adhesion thereto of salt cakes, thereby achieving an improved yield in flat glass production. Moreover, any tension acting on the transported glass ribbon may be utilized to correct the warping of the glass ribbon, whereby an improvement in glass ribbon quality is achievable at the same time.

Other advantages of the transport speed control system for a glass ribbon annealing installation according to the present invention will be apparent from the description of the preferred embodiment to follow.

DETAILED DESCRIPTION OF THE PREFERRED EMBODIMENTS

A transport speed control system for a glass ribbon annealing installation embodying the present invention will particularly be described hereinafter with reference to FIG. 1.

Figure 1:
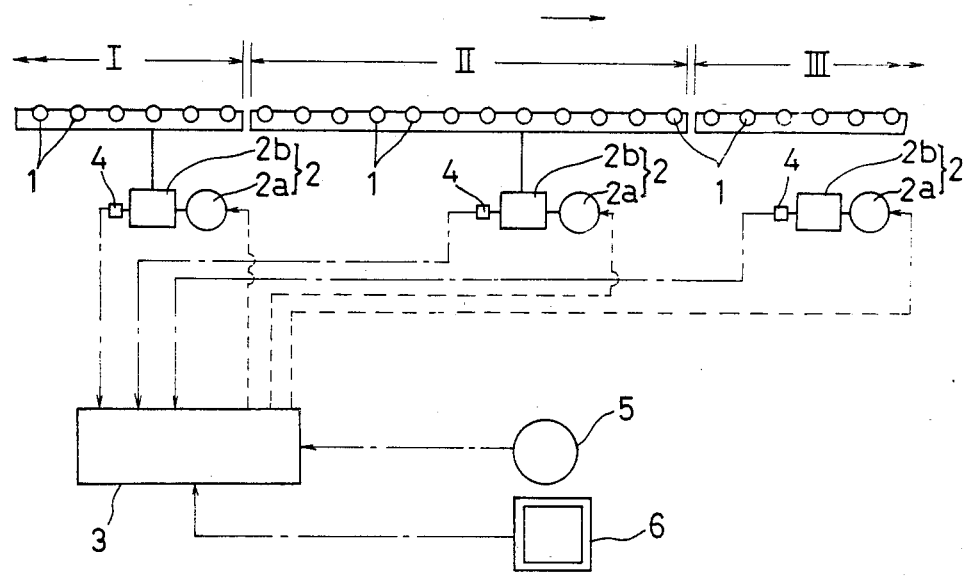
FIG. 1 is a schematic view of a transport speed control system for a glass ribbon annealing installation according to the present invention.
Figure 2:
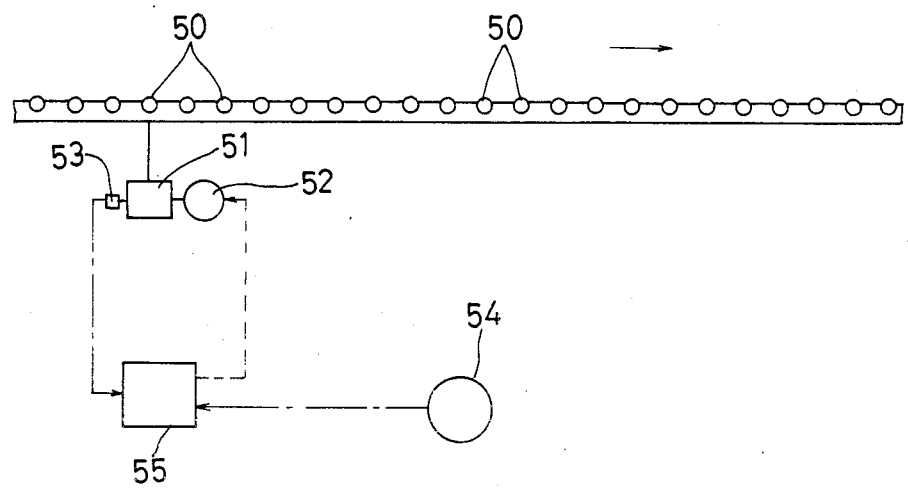
FIG. 2 is a schematic view of a conventional transport speed control system.

FIG. 1 shows a transport speed control system for a glass ribbon annealing installation including a plurality of glass ribbon transport rollers 1 in juxtaposition. This control system comprises drive mechanisms 2 for driving the glass ribbon transport rollers 1 in separate groups of selected numbers, and a control device (an accelerating device) 3 for controlling the roller drive such that the groups of rollers 1 rotate at a higher peripheral speed progressively toward a downstream end with respect to a direction of glass ribbon transport.

Each drive mechanism 2 includes a motor 2a and a speed reducer 2b operatively connected to the motor 2a. Each group of rollers 1 is driven by power provided through the speed reducer 2b. This motor 2a may be connected to and controlled by an inverter, or may be connected to a tachogenerator.

The control device 3 comprises a computerized control unit which receives signals from speed sensors 4, a drive speed setter 5 and a speed ratio setter 6, and outputs control signals to the motors 2a. The speed sensors 4 detect peripheral speeds of three, first to third groups I, II and III of rollers 1 on the basis of rotational rates of the speed reducers 2b, respectively, and output corresponding detection signals to the control device 3. The drive speed setter 5 sets a drive speed for the first group I of rollers 1 located at a most upstream part with respect to the glass ribbon transport direction. The speed ratio setter 6 sets speed increase ratios for the second and third groups II, III of rollers 1 with respect to the peripheral speed of the first group I, respectively. Thus, the respective groups of roller 1 are driven at the peripheral speeds corresponding to the drive speed set by the drive speed setter 5 and to the speed increase ratios set by the speed ratio setter 6.

The transport speed control system for a glass ribbon annealing installation having the above construction was used to produce flat glass ribbon having a 2 mm thickness.

The transported glass ribbon showed a deformation not less than 0.5% when all the groups I, II and III of rollers 1 were driven at an equal peripheral speed. The deformation of the transported glass ribbon did not exceed 0.1% when the second and third groups II, III of rollers 1 were driven at 2% and 4% speed increase ratios with respect to the peripheral speed of the first group I of rollers 1, respectively. In the latter case, however, the glass ribbon was slightly abraded.

Then speed increase ratios were reviewed in various ways in order to find conditions for further improvement. As a result, the transported glass ribbon showed a minimum of deformation with the abrasion effectively prevented when the second group II of rollers was driven at a ratio of 0–2% and the third group III at a ratio of 1–5% though the state of roller surfaces had to be taken into account. In particular, it has been found desirable to set the greater speed increase ratios the thinner the flat glass ribbon is.

Similarly a flat glass ribbon of 1 mm thickness was produced. In this instance, the flat glass ribbon developed cracks on its surface every several minutes when all the groups I, II and III of rollers were driven at an equal speed. Then the second and third groups II, III of rollers 1 were driven at 1% and 3% speed increase ratios with respect to the peripheral speed of the first group I of rollers 1, respectively, which resulted in no cracks on the flat glass surface.

In this case it is desirable to provide control such that there is a sufficiently small difference between the advancing speed of the glass ribbon and the drive peripheral speed of the rollers in order not to abrade the glass ribbon surface.

It is desirable to divide the rollers 1 into a plurality of groups at the place where the transported glass ribbon has a temperature not exceeding 400° C. and the number of rollers in the downstream group is one third or more of the total number of rollers.

Other embodiments of the present invention will be described next.

While in the foregoing embodiment the rollers 1 are divided into three groups, the rollers may be divided into two groups or four or more groups. It is preferable to divide the rollers into a large number of groups. Ultimately the peripheral speed should desirably be controlled for individual rollers.

If the rollers 1 are divided into a large number of groups and driven at peripheral speeds corresponding to a glass ribbon transport speed, flaws on a bottom surface may advantageously be reduced for flat glass having a 3 mm or greater thickness.

In the foregoing embodiment, the peripheral speeds of the rollers are detected indirectly on the basis of rotational rates of the speed reducers 2b. The peripheral speeds of the rollers may be detected directly instead.

Instead of providing the drive mechanism for each group of rollers, power from one drive source may be branched off to all the groups with a change speed mechanism mounted on each of the branched transmission lines.

The control device 3 in the foregoing embodiment comprises a computerized control unit. Alternatively, the control device may comprise a plurality of gears having different gear ratios to drive the respective groups of rollers at fixed peripheral speeds such that downstream groups are rotatable at higher speeds.

What is claimed is:

1. A transport speed control system for a glass ribbon annealing installation comprising:
   a plurality of glass transport rollers juxtaposed in a glass ribbon annealing lehr, each of said plurality of rollers having a peripheral surface;
   drive means for driving said rollers; said plurality of rollers being divided into a plurality of groups;
   means for sensing the speed of rotation of said peripheral surface of each of said rollers resulting from the effects of thermal expansion, salt caking and eccentricity of each of said groups of rollers;
   means for selectively controlling the circumferential drive speed of each of said plurality of groups of rollers in response to a signal from said sensing means;
   said control means controlling said drive means for driving at higher speeds those groups of rollers which contact a portion of said glass ribbon at a position downstream of a least the mid-position of said glass ribbon with respect to a direction of transport;
   said control means controlling said drive means for driving at lower speeds those groups of rollers which contact a portion of said glass ribbon at a position upstream of said mid-position of said ribbon;
   said control means controlling the speed difference between said higher speed rollers and said lower speed rollers to prevent any abrasion from occuring on the surface of said glass ribbon; and
   said control means further controlling said difference in roller speeds to accomodate thermal expansion and eccentricity of said rollers and of adhesion thereto of salt cakes.

2. A transport speed control system as claimed in claim 1 wherein the rollers are divided into said groups at a place where the transported glass ribbon has a temperature not exceeding 400° C. and the number of rollers in a downstream group is one third or more of the total number of rollers.

3. A transport speed control system as claimed in claim 1 wherein each of said groups of rollers to be driven group by group comprises a single roller.

4. A transport speed control system for a glass ribbon annealing installation comprising:
   a plurality of glass transport rollers juxtaposed in a glass ribbon annealing lehr, each of said plurality of rollers having a peripheral surface;
   drive means for driving said rollers;
   said plurality of rollers being divided into a plurality of groups;
   means for sensing the speed of rotation of said peripheral surface of each of said rollers resulting from the effects of thermal expansion, salt caking and eccentricity of each of said groups of collers;

means for selectively controlling the circumferential drive speed of each of said plurality of groups of rollers in response to a signal from said sensing means;

said control means controlling said drive means for driving at higher speeds those groups of rollers which control a portion of said glass ribbon at a position downstream of at least the mid-position of said glass ribbon with respect to a direction of transport;

said control means controlling said drive means for driving at lower circumference speeds those groups of rollers which contact a portion of said glass ribbon at a position upstream of said mid-position of said ribbon; and said groups of rollers juxtaposed on said lehr including an initial upstream group and a final downstream group and intermediate groups therebetween;

each of said groups of rollers having a circumferential speed which is different from its adjacent group of rollers, said initial group of rollers having the slowest speed and said final downstream group of rollers having the fastest speed.

5. A transport speed control system as claimed in claim 4 further comprising:

sensors for generating detection signals for detecting peripheral speeds of the respective groups of rollers;

a drive speed setter for generating a speed setting signal for setting a peripheral speed for one group of rollers;

a speed ratio setter for generating ratio setting signals for setting speed increase ratios for the other groups of rollers;

wherein said control means comprises a control unit for outputting control signals to said drive means in response to said detection signals, said speed setting signal, and said ratio setting signals.

6. A transport speed control system as claimed in claim 5 wherein said drive means includes a plurality of gears having different gear ratios associated with the respective groups of rollers.

* * * * *